No. 873,631. PATENTED DEC. 10, 1907.
A. T. SULLIVAN.
ANIMAL TRAP.
APPLICATION FILED JULY 17, 1907.
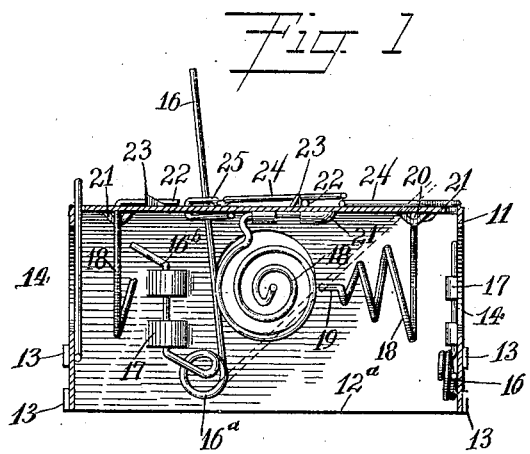
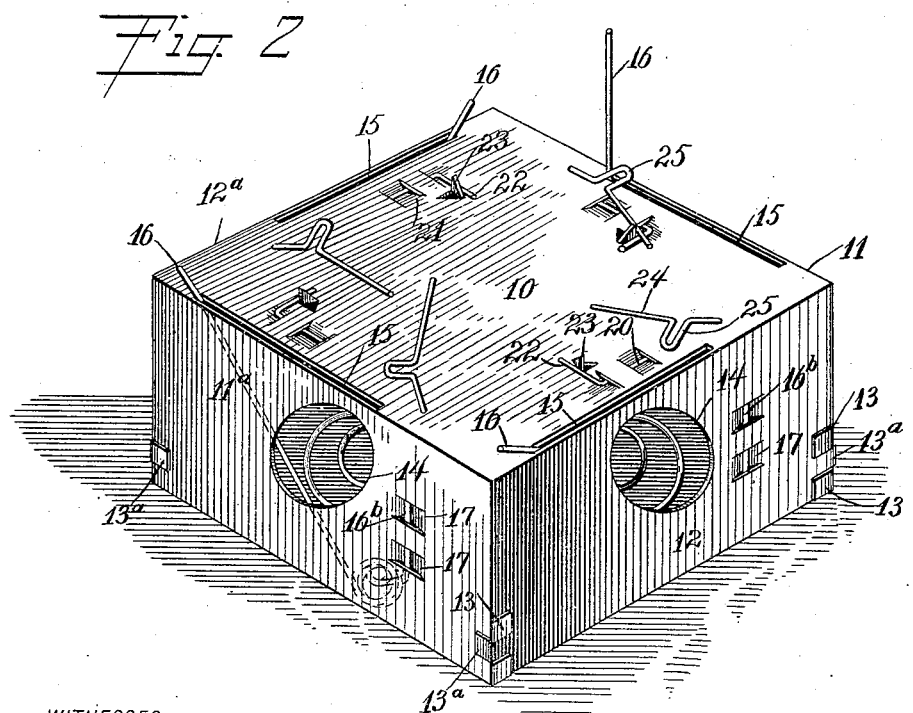
WITNESSES
E. G. Bromley
J. Ed Acker
INVENTOR
Alonzo Taylor Sullivan
BY Munn & Co.
ATTORNEYS
THE NORRIS PETERS CO., WASHINGTON, D. C.

UNITED STATES PATENT OFFICE.

ALONZO TAYLOR SULLIVAN, OF MALCOLM, NEBRASKA.

ANIMAL-TRAP.

No. 873,631.　　　　Specification of Letters Patent.　　　　Patented Dec. 10, 1907.

Application filed July 17, 1907. Serial No. 384,189.

*To all whom it may concern:*

Be it known that I, ALONZO TAYLOR SULLIVAN, a citizen of the United States, and a resident of Malcolm, in the county of Lancaster and State of Nebraska, have invented a new and Improved Animal-Trap, of which the following is a full, clear, and exact description.

The purpose of the invention is to improve upon the construction of the animal trap for which Letters Patent No. 599,407, were granted to me February 22, 1898, to such an extent that it will be simplified and rendered more economical in general construction, more sensitive when set, and more flexible and positive in action when tripped.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in both the figures, and in which Figure 1 is a vertical section through the improved trap; and Fig. 2 is a perspective view of the trap drawn upon an enlarged scale.

The body of the trap has a box body and is made from one piece of light metal, which is cut and bent upon itself to form a top 10 and sides 11, 11$^a$, 12 and 12$^a$. After the box body has been formed, the sides are joined together by lips 13 and 13$^a$, that are formed upon the abutting edges of the sides of the body and are made to overlap the said edges, as is clearly shown in Fig. 2. Each side of the body is provided with an opening 14, that is adapted to receive the head of an animal, and a slot 15 is made in the top of the body adjacent to each of the openings 14, as is clearly shown in Fig. 2. In connection with each opening 14 and slot 15, a choker arm 16 is employed, and these arms extend out through the slots 15 and are so mounted in the said body that they traverse the opposite openings 14. Each choker arm is provided within the body adjacent to its lower end, with a coil 16$^a$, as is shown in Fig. 1, and the inner end 16$^b$ of each choker arm 16 is secured to the inner face of the side of said body by suitable bearings 17, clamps, or their equivalents, usually struck out from the material forming the said sides, as is indicated in Fig. 1. Normally the coils 16$^a$ in the said choker arms 16 cause the body portions of the arms to assume the diagonal position particularly shown at the left in Fig. 2. At the rear of each opening 14, and also within the said body, a bait carrier 18 is located, in the form of a spiral, as is particularly shown in Fig. 1. The reduced end of the spiral faces inward and is made practically straight, as is shown at 19 in Fig. 1, in order to readily receive the bait. Each spiral bait holder 18 is provided at its upper end with a straight pivotal member 20, and these pivotal members 20 are mounted in bearings 21, that are produced directly in the top portion 10 of the said body, as is particularly shown in Fig. 2, and at the outer end of each pivotal member 20 of each spiral bait holder 18, a crank arm 22 is formed, each crank arm 22 constituting a trigger that lies normally flat upon the upper face of the body. Adjacent to each trigger 22 an upwardly-extending lug 23 is located, formed by striking up the top portion 10 of said body, and the edge of the lug 23 that faces the opening 14 in the body is straight or vertical, while the opposing edge is more or less inclined. These lugs 23 constitute stops for locking arms 24, which arms are pivoted upon the top member 10 of the body and are provided between their ends with an offset 25, adapted for engagement with the projecting body portion of a choker arm 16.

In the operation of the device, to set the trap, a choker arm is carried to the perpendicular position shown in Fig. 1 and likewise at one side of Fig. 2, and then the locking arm for that choker arm is carried outward until the projection 25 of the locking arm assumes a position in front of the choker arm, at which time the free end of the locking arm is carried up the inclined face of the stop belonging to it, and is dropped down to an engagement with the vertical face of the stop and in engagement with the trigger belonging to that portion of the trap. The moment an animal reaches through the opening 14, at which the choker arm is set, to obtain the bait, the bait holder being sensitively hung is forced inward and consequently the trigger 22 carried thereby is forced upward, and the locking device 24 is released from the choker arm, the coil spring 16$^a$ thereof carries the said choker arm violently across the opening 14 in engagement with the animal's throat, choking it.

It will be observed that each choker arm is made to operate as closely as possible to the inner face of a side of the body.

Having thus described my invention, I claim as new and desire to secure by Letters Patent:

1. In an animal trap, a box body having openings in its sides for the reception of the head of an animal, a spiral bait carrier pivoted within the body at the rear of each of said openings, a trigger carried by the pivotal member of each spiral bait carrier, a spring-controlled choker arm mounted for movement in the body across each of said openings and in front of the spiral bait carrier, a locking arm for each choker arm adapted for engagement with the trigger of a spiral bait carrier when in locking engagement with the choker arm, and a stop for each locking arm.

2. In an animal trap, a box body having an opening in its sides for the reception of the head of an animal and a slot in the top adjacent to said opening, a spring-controlled choker arm secured within the body and adapted to traverse said opening and travel in said slot, a spiral bait carrier pivotally suspended in the body back of said opening, a trigger constituting a portion of the spiral bait carrier and located at the top of the body, a stop adjacent to the trigger, and a locking arm adapted to simultaneously engage with the upper end of the choker arm and said trigger and stop.

3. In an animal trap, the combination with a body constructed of one piece of material and cut and bent upon itself to form four sides and a top, the sides at their abutting edges being provided with overlapping lips, each side having an opening therein for the reception of an animal's head, and a slot in the top above and adjacent to each side opening, of a bait carrier in the form of a spiral located within the body opposite each side opening, each spiral bait carrier being provided with an upper straight member pivoted to the top of the body, and a trigger that extends from said member and lies upon the upper face of the body, a stop adjacent to each trigger, a choker arm located between each side opening and accompanying spiral bait carrier, said arms being adapted to traverse said openings, each choker arm having an end extending out through a slot in the body, the other end being secured within the body, and each arm being provided with a coil between its ends within the body, a locking arm for each choker arm adapted for engagement with it and with the trigger, and a stop for each locking arm.

4. In an animal trap, a body provided with an opening for an animal and a slot in its top adjacent to the opening, a pivoted bait carrier in rear of the opening, and having an angular arm normally lying on the top of the body, a spring actuated choker arm working in the slot of the body, a stop on the top adjacent to the arm of the bait carrier and a pivoted locking arm on the top of the body, said locking arm being provided with a lateral member engaging the choker arm and having its free end extending across the angular arm of the bait carrier and engaging the said stop.

5. In an animal trap, a body provided with an opening, a pivoted bait carrier in rear of the opening and having a crank arm normally lying on the body, a spring actuated choker arm, a stop on the body adjacent to the crank arm of the bait carrier, and a pivoted locking arm engaging the choker arm and having its free end extending across the crank arm of the bait carrier and engaging the said stop.

In testimony whereof I have signed my name to this specification in the presence of two subscribing witnesses.

ALONZO TAYLOR SULLIVAN.

Witnesses:
Ed. Cerf,
Ed. Gugenheim.